United States Patent
Kinugawa et al.

(10) Patent No.: US 10,904,819 B2
(45) Date of Patent: Jan. 26, 2021

(54) COMMUNICATION DEVICE FOR WORKING MACHINE, MOBILE TERMINAL, COMMUNICATION SYSTEM FOR WORKING MACHINE, AND COMMUNICATION PROCESSING METHOD FOR WORKING MACHINE

(71) Applicant: KUBOTA CORPORATION, Osaka (JP)

(72) Inventors: Ryosuke Kinugawa, Osaka (JP); Keisuke Egashira, Osaka (JP); Keisuke Miura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/225,698

(22) Filed: Dec. 19, 2018

(65) Prior Publication Data

US 2019/0200276 A1   Jun. 27, 2019

(30) Foreign Application Priority Data

Dec. 21, 2017 (JP) ................. 2017-245207

(51) Int. Cl.
| | |
|---|---|
| H04W 40/24 | (2009.01) |
| H04W 4/80 | (2018.01) |
| H04W 76/11 | (2018.01) |
| H04W 88/02 | (2009.01) |
| H04L 29/08 | (2006.01) |
| H04W 4/40 | (2018.01) |

(52) U.S. Cl.
CPC ......... *H04W 40/244* (2013.01); *H04L 67/125* (2013.01); *H04W 4/40* (2018.02); *H04W 4/80* (2018.02); *H04W 76/11* (2018.02); *H04W 88/02* (2013.01); *H04L 67/12* (2013.01)

(58) Field of Classification Search
CPC ....... H04W 40/24; H04W 4/80; H04W 76/11; H04W 88/02; H04W 4/04; H04W 4/008
See application file for complete search history.

(56) References Cited

U.S. PATENT DOCUMENTS

| | | | |
|---|---|---|---|
| 6,628,938 B1 * | 9/2003 | Rachabathuni | .. H04N 21/25841 455/456.3 |
| 9,363,318 B2 | 6/2016 | Nelson et al. | |
| 9,380,417 B1 * | 6/2016 | Boyle | ........... H04W 4/023 |
| 2008/0298375 A1 * | 12/2008 | Agardh | ........... H04L 63/065 370/397 |
| 2015/0341440 A1 | 11/2015 | Nelson et al. | |

(Continued)

FOREIGN PATENT DOCUMENTS

JP    2015-65903 A    4/2015

*Primary Examiner* — Rasheed Gidado
(74) *Attorney, Agent, or Firm* — Greenblum & Bernstein, P.L.C.

(57) ABSTRACT

A communication device for a working machine disposed on the working machine and configured to be connected to a mobile terminal, includes a first communication circuit to transmit, to the mobile terminal, an application identifier with a beacon conforming to Bluetooth Low Energy (a registered trademark) and to transmit data to the mobile terminal after the mobile terminal activates an application corresponding to an application identifier, the data relating to the working machine and corresponding to the application.

18 Claims, 6 Drawing Sheets

(56) References Cited

U.S. PATENT DOCUMENTS

| | | | |
|---|---|---|---|
| 2015/0382150 A1* | 12/2015 | Ansermet | A61B 5/112 455/41.1 |
| 2016/0165056 A1* | 6/2016 | Bargetzi | G06F 3/04842 455/416 |
| 2016/0227381 A1* | 8/2016 | Bargetzi | H04L 63/105 |
| 2016/0277999 A1* | 9/2016 | Graves | H04L 67/20 |
| 2017/0094484 A1* | 3/2017 | Li | H04H 60/52 |
| 2017/0201520 A1* | 7/2017 | Chandoor | H04L 63/108 |
| 2018/0255150 A1* | 9/2018 | Williams | H04L 41/12 |

* cited by examiner

FIG.2B

| iBeacon UUID | Application software |
|---|---|
| 5A3D | Collecting application |
| 5A3E | Starting application |
| . | . |
| . | . |
| . | . |

COMMUNICATION DEVICE FOR WORKING MACHINE, MOBILE TERMINAL, COMMUNICATION SYSTEM FOR WORKING MACHINE, AND COMMUNICATION PROCESSING METHOD FOR WORKING MACHINE

CROSS-REFERENCE TO RELATED APPLICATIONS

The present application claims priority under 35 U.S.C. § 119 to Japanese Patent Application No. 2017-245207, filed Dec. 21, 2017. The content of this application is incorporated herein by reference in their entirety.

BACKGROUND OF THE INVENTION

Field of the Invention

The present invention relates to a communication device for a working machine, a mobile terminal, a communication system for the working machine, and a communication processing method for the working machine.

Description of Related Art

U.S. Pat. No. 9,363,318 is previously known as a technique for performing communication between a vehicle and a mobile terminal. In U.S. Pat. No. 9,363,318, an application identifier used for identifying an application is transmitted from the vehicle computer side to the mobile terminal, and the mobile terminal that has received the application identifier determines an application corresponding to the application identifier, then after activating the application, the mobile terminal side transmits data relating to the application to the vehicle computer.

SUMMARY OF THE INVENTION

A communication device for a working machine disposed on the working machine and configured to be connected to a mobile terminal, includes a first communication circuit to transmit, to the mobile terminal, an application identifier with a beacon conforming to Bluetooth Low Energy (a registered trademark) and to transmit data to the mobile terminal after the mobile terminal activates an application corresponding to an application identifier, the data relating to the working machine and corresponding to the application.

A mobile terminal to be connected to a communication device disposed on a working machine, includes a first receiving circuit to receive an application identifier with a beacon conforming to Bluetooth Low Energy (a registered trademark), the beacon being transmitted from the communication device, an activation circuit to activate an application corresponding to the application identifier after the first receiving circuit receives the application identifier, and a second receiving circuit to receive data relating to the working machine and being transmitted from the communication device, the data corresponding to the application.

A communication system for a working machine includes a communication device disposed on the working machine, and a mobile terminal to be connected to the communication device. The communication device transmits, to the mobile terminal, an application identifier with a beacon conforming to Bluetooth Low Energy (a registered trademark). The mobile terminal activates an application corresponding to the application identifier. The communication device transmits data to the mobile terminal after being connected to the mobile terminal, the data relating to the working machine and corresponding to the application of the mobile terminal.

A communication processing method for a working machine in which a communication device disposed on the working machine is connected to a mobile terminal to be connected to the communication device, includes transmitting, by the communication device, an application identifier with a beacon conforming to Bluetooth Low Energy (a registered trademark) to the mobile terminal, activating, by the mobile terminal, an application corresponding to the application identifier, and transmitting, by the communication device, data to the mobile terminal after being connected to the mobile terminal, the data relating to the working machine and corresponding to the application of the mobile terminal.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2B is a view illustrating an embodiment of an application according to the embodiment;

DESCRIPTION OF THE EMBODIMENTS

Figure 1:
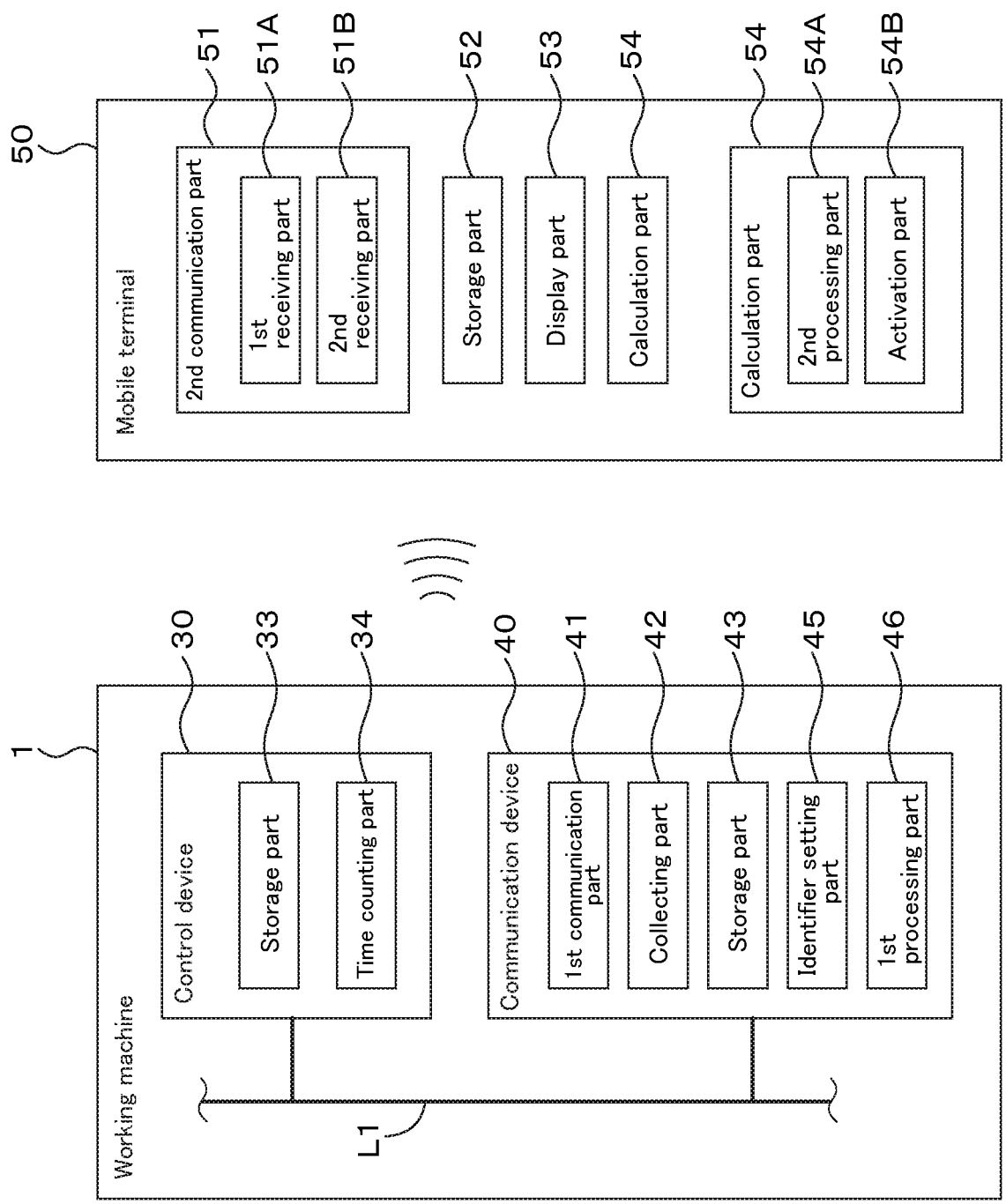
FIG. 1 is a schematic view illustrating a data communication system for a working machine according to an embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings as appropriate.

Figure 5:
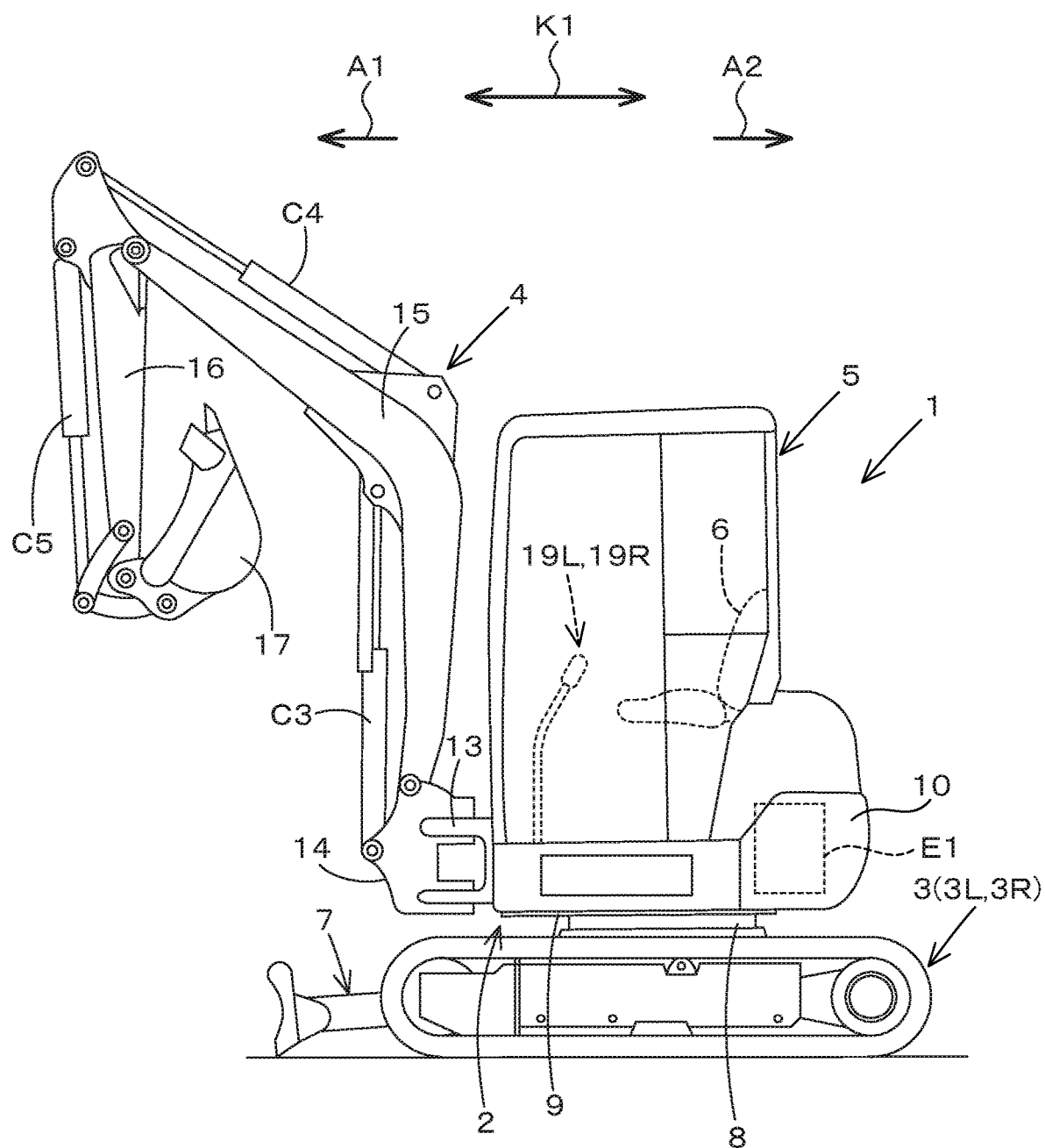
FIG. 5 is a schematic view illustrating a side view of a working machine according to the embodiment.

FIG. 5 is a schematic view showing a side surface of the overall configuration of the working machine 1 according to the present embodiment. In the present embodiment, a backhoe which is a swiveling working machine is exemplified as the working machine 1.

In this embodiment, although a backhoe is exemplified as the working machine 1, the working machine may be an agricultural machine such as a tractor, a combine, and a rice transplanter, a compact track loader, a skid steer loader, or the like.

The overall configuration of the working machine 1 will be described at first.

As shown in FIG. 5, the working machine 1 includes a machine body 2, a traveling device 3, and a work device 4. A cabin 5 is mounted on the machine body 2. An operator seat 6 is provided in the interior of the cabin 5.

In this embodiment, the front side of a driver (the operator) seated on the operator seat of the working machine 1 (the direction indicated by an arrowed line A1 in FIG. 5) is defined as the front, the rear side of the operator (the direction indicated by an arrowed line A2 in FIG. 5) is defined as the rear, the left side of the operator (on the front surface side of FIG. 5) is defined as the left, and the right side of the operator (on the back surface side of FIG. 5) is defined as the right.

In addition, the horizontal direction which is a direction orthogonal to the front-back direction K1 is referred to as the machine width direction in the explanation. The direction from the center portion of the machine body 2 toward the right portion in the width direction of the machine body 2 will be referred to as a machine outward direction, and the direction from the center portion of the machine body 2 toward the left portion in the width direction of the machine body 2 also will be referred to as the machine outward direction.

In other words, the machine outward direction is equivalent to the machine width direction, and means a direction separating away from the center of the machine body 2 in the machine width direction. The following explanation will be made defining a direction opposite to the machine outward direction as the machine inward direction. In other words, the machine inward direction is equivalent to the machine width direction, and means a direction approaching the center of the machine body 2 in the machine width direction.

As shown in FIG. 5, the traveling device 3 includes a traveling body 3L and a traveling body 3R, the traveling body 3L is provided on the left side, and the traveling body 3R is provided on the right side. The traveling body 3L and the traveling body 3R are each constituted of crawler type traveling devices. A dozer device 7 is attached to the front portion of the traveling device 3. The dozer device 7 is configured to be vertically move (raise and lower the blade) by the strand the likehing and shortening of the dozer cylinder.

The machine body 2 is a turn base (a swiveling base), and is supported on the traveling device 3 so as to be freely turned about a longitudinal axis (an axis extending in the vertical direction) via a turn bearing 8. The machine body 2 is configured to be pivotally driven by a turn motor consisting of a hydraulic motor (a hydraulic actuator). The machine body 2 has a weight 10 and a turn base plate 9 configured to turn about the vertical axis.

The turn base plate 9 is formed of a steel plate or the like, and is connected to the turn bearing 8. The weight 10 is provided at the rear portion of the machine body 2. A prime mover E1 is mounted on the rear portion of the machine body 2. The prime mover E1 is a diesel engine.

Meanwhile, the prime mover E1 may be an electric motor or may be a hybrid type having the diesel engine and the electric motor.

The machine body 2 has a support bracket 13 at the center of the front portion of the machine body 2 in the machine width direction, being arranged slightly rightward. A swing bracket 14 is attached to the support bracket 13 so as to be swingable about the longitudinal axis. A working device 4 is attached to the swing bracket 14.

As shown in FIG. 5, the working device 4 has a boom 15, an arm 16, and a bucket (a working tool) 17. The base portion of the boom 15 is pivotally attached to the swing bracket 14 so as to be rotatable about a horizontal axis (an axis extending in the machine width direction). In this manner, the boom 15 is configured to be freely swung upward and downward.

The arm 16 is pivotally attached to the tip end side of the boom 15 so as to be rotatable about the horizontal axis. In this manner, the arm 16 is configured to be freely swung forward and backward or upward and downward. The bucket 17 is provided on the tip end side of the arm 16 so as to perform the shoveling operation and the dumping operation.

Instead of or in addition to the bucket 17, it is possible for the working tool 1 to mount another working tool (an auxiliary attachment) that is configured to be driven by a hydraulic actuator.

Examples of other working tools (the auxiliary attachments) include a hydraulic breaker, a hydraulic crusher, an angle bloom, a ground auger, a pallet fork, a sweeper, a mower, a snow blower, and the like.

The swing bracket 14 is configured to be swung by the strand the likehing and shortening of a swing cylinder that is provided in the machine body 2. The boom 15 is configured to be swung by the strand the likehing and shortening of the boom cylinder C3. The arm 16 is configured to be swung by the strand the likehing and shortening of the arm cylinder C4.

The bucket 17 is configured to freely perform the shoveling performance and the dumping operation due to the strand the likehing and shortening of the buckand the likeylinder (the working tool cylinder) C5. Each of the dozer cylinder, the swing cylinder, the boom cylinder C3, the arm cylinder C4, and the buckand the likeylinder C5 is constituted of a hydraulic cylinder (a hydraulic actuator).

As shown in the drawings, an operation device 19L is provided on the left side of the operator seat 6 in the cabin 5, and an operation device 19R is provided on the right side of the operator seat 6.

As shown in FIG. 1, the working machine 1 has a control device 30. The control device 30 is a device configured to perform the control relating to the working machine 1, and performs various controls such as, for example, the hydraulic control, the automatic idle control (the AI control), the boom height control, the arm height control, and the anti-theft control.

Various sensors are connected to the control device 30, and the values (the signals) detected by the sensors are inputted to the control device 30. For example, an operation amount of the operation device (the operation device 19L, the operation device 19R) detected by a position sensor or the like, a governor angle (a governor position) detected by a governor sensor, an operation amount of the accelerator detected by a position sensor or the like, an engine revolution speed detected by the revolution sensor or the like, and an angle of the arm and an angle of the boom detected by the angle sensor or the like are inputted to the control device 30.

In the hydraulic control, the control device 30 outputs a control signal to the proportional solenoid valve or the like in accordance with the operation amounts of the operation devices 19L and 19R, and sets the opening degree of the proportional solenoid valve and thereby controls a flow rate control valve connected to the proportional solenoid valve.

That is, in the hydraulic control, the flow rate control valve configured to control the hydraulic actuators (the swing cylinder, the boom cylinder C3, the arm cylinder C4, and the buckand the likeylinder) are controlled.

In the automatic idle control, when the control devices 19L and 19R are operated, the control device 30 outputs, to the engine, the control signal corresponding to the operation amount of the accelerator, and thereby increases and decreases the engine revolution speed. When the operation controllers 19L and 19R are not operated, the control device 30 outputs, to the engine, a control signal indicating the idling revolution speed is outputted to the engine, and thereby fixes the engine revolution speed to the idling state.

In the boom height control, when the height of the boom 15 reaches the upper limit value of the boom height preliminarily set in the boom height control, the control device 30 stops the upward moving of the boom 15 irrespective of the operations of the control devices 19L and 19R.

That is, in the boom height control, when the boom angle at the time of upward moving operation of the boom 15 reaches the upper limit value, the flow rate control valve corresponding to the boom cylinder C3 is controlled, and thereby the upward moving of the boom 15 is stopped.

In the angle control of the arm. when the angle of arm reaches the upper limit value or the lower limit value of the angle of arm angle (the arm angle) preliminarily set, the control device 30 controls the arm 16 to stop the scraping operation irrespective of the operations of the operation devices 19L and 19R.

That is, in the arm angle control, when the arm angle at the time of the scraping operation of the arm 16 reaches the upper limit value or the lower limit value, the control device 30 controls the flow rate control valve corresponding to the arm cylinder C4, and thereby stops the scraping operation of the arm 16.

In the anti-theft control, when authentication between the authentication information registered in advance (the second authentication information) and the authentication information (the first authentication information) transmitted from the outside such as the mobile terminal 50 is established, the control device 30 provides permission to start the prime mover E1 (the engine), and thereby drives the engine.

In addition, in the anti-theft control, when the authentication between the first authentication information and the second authentication information is not established, the control device 30 does not provide the permission of the engine start, and thereby does not start the engine.

As described above, the control device 30 is configured to perform various controls such as the hydraulic control, the automatic idle control (the AI control), the boom height control, the arm height control, the anti-theft control, and the like. Meanwhile, the controls described above are just the examples and are not limited, and the control device 30 executes necessary controls in accordance with to the modes of the working machine 1.

The control device 30 has a storage part (a storage device) 33 and a time counting part 34. The time counting part 34 is constituted of electric/electronic parts provided in the control device 30, programs stored in the control device 30, or the like. The time counting part 34 counts the operation time until the input of the engine revolution speed to the control device 30 is terminated from the time of starting to input, to the control device 30, the engine revolution speed detected by the engine rotation sensor (start of driving) until the engine revolution speed reaches the control device 30.

In other words, the time counting part 34 obtains, by a timer or the like, the time (the elapsed time) during which the engine is driven. For example, when the engine is driven continuously from 9 o'clock to 12 o'clock, the operation time (the elapsed time) is 3 hours. The time counting part 34 obtains the accumulated operation time (the hour meter) by accumulating the counted operation time every time when the engine is driven (from the start of driving the engine to the end of driving the engine).

In this embodiment, the accumulated value of the operation time from the start of driving the engine to the end of driving the engine is set as the accumulated operation time.

However, the time during which the driven parts other than the engine is driven may be employed as the accumulated operation time (the hour meter), and the driving parts are not limited to the engine. The storage part 33 is constituted of a nonvolatile memory or the like, and is configured to store the accumulated operation time counted by the time counting part 34.

As shown in FIG. 1, the working machine 1 has a communication device 40. The communication device 40 is a device configured to output the data (the information) of the working machine 1 to the outside of the working machine 1 and to capture the external data to the working machine 1. The communication device 40 has a first communication part 41. The first communication part 41 is configured to be connected to the mobile terminal 50.

For example, the first communication part 41 can transmit, to the mobile terminal 50, a beacon of a communication scheme conforming to the Bluetooth (a registered trademark) Low Energy in the Bluetooth (a registered trademark) specification of the communication standard IEEE 802.15.1 series. The beacon transmitted by the first communication part 41 is the iBeacon (a registered trademark).

Figure 2A:
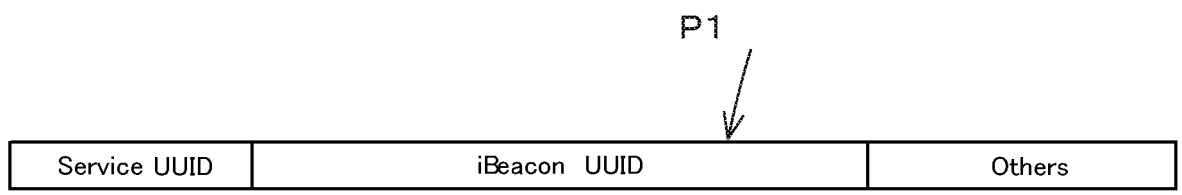
FIG. 2A is a schematic view illustrating an advertisement packet according to the embodiment.

As shown in FIG. 2A, the iBeacon includes an advertisement packet P1. The advertisement packet P1 includes a service UUID (a Service Universal Unique Identifier) and an iBeacon UUID that is the unique iBeacon.

An application identifier is set to the iBeacon UID. The application identifier is information for identifying a plurality of prepared applications (the application software). An application identifier is assigned to each of a plurality of applications.

For example, in this embodiment, as shown in FIG. 2B, the plurality of applications include a collecting application for collecting the machine information of the working machine and a starting application for judging whether to allow start of the driving part of the working machine.

The communication device 40 includes a collecting part 42 and a storage part (a storage device) 43. The collecting part 42 is composed of electric/electronic parts provided in the communication device 40, programs stored in the communication device 40, and the like.

The collecting part 42 collects the machine information on the working machine. In particular, the communication device 40, the control device 30 provided in the working machine 1, and the devices such as sensors are connected by a communication line L1 or the like. The collecting part 42 acquires various signals flowing in the communication line L1 (the data) as the machine information.

In particular, the collecting part 42 collects, as the machine information, signals from various types of the sensors, cumulative operation time, and the like under the state where the controls such as the automatic idle control, the boom height control, the arm height control and the like are performed by the control device 30.

In the above-described embodiment, the signal and the cumulative operation information of the case where the control device 30 is performing the controls are the machine information. However, the machine information to be collected by the collecting part 42 is not limited thereto. The collecting part 42 may collect information on malfunction and warning of the devices mounted on the working machine 1 as the machine information, or may collect the setting values and the like of the devices of the working machine 1 as the machine information. Thus, any information on the working machine 1 can be employed.

The storage part 43 is composed of a nonvolatile memory or the like, and temporarily stores the machine information collected by the collecting part 42. The machine information temporarily stored in the storage part 43, that is, the machine information collected by the collecting part 42 is transmitted to the mobile terminal 50 by the communication device 40 (the first communication part 41).

The communication device 40 has an identifier setting part 45. The identifier setting part 45 is composed of electric/electronic parts provided in the communication device 40, programs stored in the communication device 40, and the like.

The identifier setting part 45 sets at least the second application identifier. For example, the identifier setting part 45 sets the application identifier representing the collecting application in the case where the data capacity of the machine information (the untransmitted information) that has not been transmitted to the mobile terminal 50 among all the pieces of machine information (whole of the machine information) stored in the storage part 43 is equal to or larger than a predetermined value and where the mobile terminal 50 is requested to acquire the untransmitted information.

In addition, in the case where requesting the mobile terminal 50 to transmit the first authentication information under the state where the prime mover E1 is not started, the identifier setting part 45 sets the application identifier indicating the starting application.

Hereinafter, for convenience of the explanation, the application identifier corresponding to the collecting application may be referred to as a "collection identifier", and the application identifier corresponding to the start application may be referred to as a "start identifier".

The first communication part 41 transmits, to the mobile terminal 50, the beacon including the application identifier set by the identifier setting part 45. For example, in the case where the identifier setting part 45 sets the collection identifier, the first communication part 41 transmits the beacon including the collection identifier, and in the case where the identifier setting part 45 sets the start identifier, the first communication part 41 transmits the beacon including the start identifier.

In addition, the communication device 40 has a first processing part 46. The first processing part 46 is composed of an electric/electronic component, a program stored in the communication device 40, and the like. The first processing part 46 performs a processing for pairing between the mobile terminal 50 and the communication device 40.

The mobile terminal 50 is a tablet terminal, a smart phone, a PDA, or the like, and can be carried around. The mobile terminal 50 is configured to be connected to the communication device 40 provided in the working machine 1, and is configured to transmit and receive the various data (the information) to and from the communication device 40. The mobile terminal 50 has a second communication part 51.

The second communication part 51 is composed of a communication module or the like for performing the short-range communication and the long-range communication, and performs the wireless communication with the communication device 40 in accordance with the Bluetooth (a registered trademark) Low Energy and the like in the specification of Bluetooth (a registered trademark) of the communication standard IEEE 802.15.1 series. Meanwhile, note that the second communication part may perform the wireless communication in the mobile phone communication network, the data communication network, or the like.

The second communication part 51 includes a first receiving part 51A and a second receiving part 51B. The first receiving part 51A and second receiving part 51B are composed of electric/electronic components constituting the second communication part 51, programs stored in the communication device 40, and the like.

The first receiving part 51A receives the beacon including the application identifier transmitted from the communication device 40. The second receiving part 51B receives the data relating to the working machine transmitted from the communication device 40.

The mobile terminal 50 includes a storage part (a storage device) 52, a display part (a display device) 53, and a calculation part (a calculation device) 54. The storage part 52 is a nonvolatile memory, and stores the machine information received from the communication device 40, the various application software (the applications), an operation system (OS) such as iOS, and the like. The display part 53 is configured to display the various information, and is constituted of a liquid crystal panel or the like.

The calculation part 54 is composed of a CPU, the electric/electronic parts and the like provided in the mobile terminal 50, and the calculation part 54 performs the various processes of the mobile terminal 50. The calculation part 54 has a second processing part 54A and a activating part 54B.

The second processing part 54A and the activating part 54B are constituted of programs and the like stored in the calculation part 54 and the like. The second processing part 54A performs the process for pairing between the mobile terminal 50 and the communication device 40. The activating part 54B activates the application corresponding to the application identifier.

Figure 4:
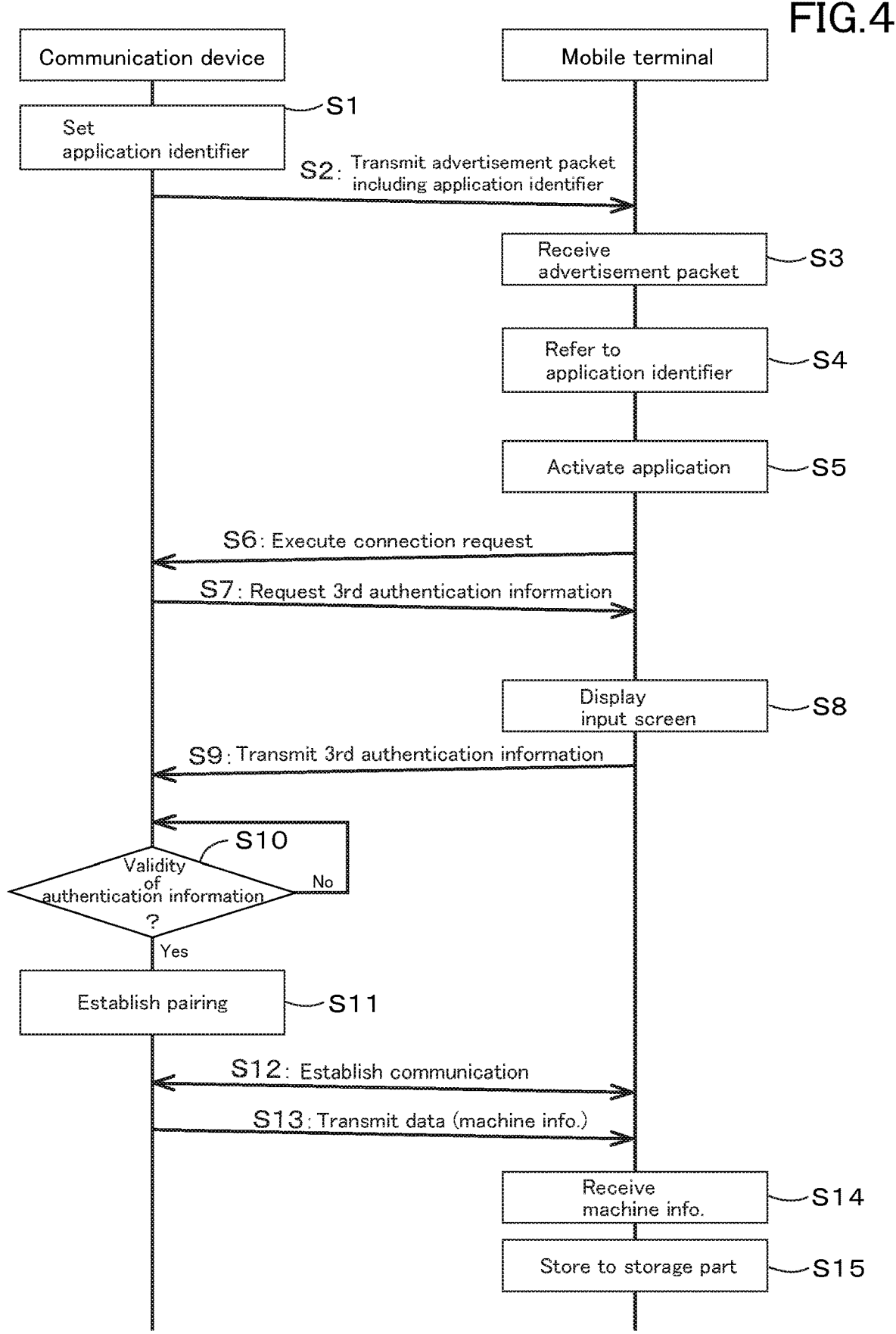
FIG. 4 is a flowchart showing a flow of connection between a communication device and a mobile terminal according to the embodiment.

FIG. 4 shows a flowchart of the connection between the communication device 40 and the mobile terminal 50. With reference to FIG. 4, the connection between the communication device 40 and the mobile terminal 50, the identifier setting part 45, the first processing part 46, the second processing part 54A, and the activating part 54B will be described in detail.

Under the state where the power from the battery or the like is supplied to the communication device 40, it is possible to transmit the beacon of the communication device 40 irregularly or periodically. For example, the power is supplied to the communication device 40 in either the OFF state or the ON state of the ignition switch of the working machine 1.

First, in the power supplying state, the identifier setting part 45 of the communication device 40 sets the application identifier as necessary (step S1: an identifier setting processing).

In the identifier setting processing S1, for example, in the case where the data capacity of untransmitted information that has not been transmitted to the mobile terminal 50 is equal to or greater than a predetermined value among all the machine information in the storage part 43, a collection identifier is added to the iBeacon UUID of the advertisement packet P1.

Meanwhile, in the above-described embodiment, the collection identifier is set when the data capacity of untransmitted information is equal to or larger than the predetermined value. However, the collection identifier is not limited to that, and the collection identifier may be set irregularly or periodically.

In the identifier setting processing S1, in the case where the engine is driven under the state where the engine is not started yet (the state in which the driving of the engine is stopped), the start identifier is set in the iBeacon UUID of the advertisement packet P1.

Upon completion of setting of the application identifier, the communication device 40 transmits, to the outside, the advertisement packet P1 including the collection identifier (step S2).

In the case where the mobile terminal 50 is present in the communication area of the advertisement packet P1 (area in which the advertisement packet P1 can be received), the first receiving part 51A of the second communication part 51 receives the advertisement packet P1 (step S3).

After the first receiving part 51A receives the advertisement packet P1 (after step S3), the activating part 54B of the mobile terminal 50 refers to the application identifier of the advertisement packet P1 (step S4).

The activating part 54B activates the application corresponding to the application identifier referred above (step S5).

For example, in the case where the application identifier is the collection identifier, the activating part 54B activates the collecting application.

After activating the application, the calculation part 54 executes the processing according to the activated application (an application processing).

Next, the application processing will be described in detail on the premise that the collecting application has been activated.

In the application processing, as the pairing processing, the second processing part 54A of the mobile terminal 50 notifies the second communication part 51 of a command to issue a connection request at first, and the second communication part 51 executes the connection request to the communication device 40 (step S6).

When the first communication part 41 of the communication device 40 receives the connection request, the first processing part 46 of the communication device 40 issues a command of requesting the third authentication information to the first communication part 41 of the communication device 40 in response to the connection request from the second processing part 54A of the mobile terminal 50, and the first communication part 41 requests the mobile terminal 50 of the third authentication information (step S7).

The third authentication information is information necessary for authentication of the pairing between the communication device 40 and the mobile terminal 50, and consists of the predetermined alphanumeric characters or the like.

Figure 3:
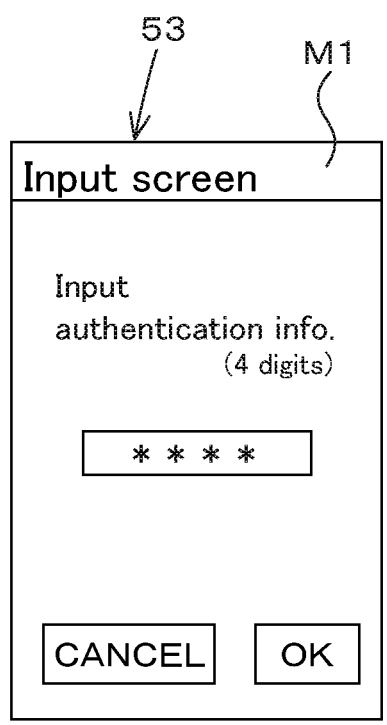
FIG. 3 is a view illustrating a relation between a plurality of applications and an application identifier according to the embodiment.

When the second communication part 51 of the mobile terminal 50 receives the request for the third authentication information, the second processing part 54A of the mobile terminal 50 displays an input screen M1 for inputting the third authentication information on the display part 53 in response to the request of the third authentication information by the first processing part 46 of the communication device 40, as shown in FIG. 3 (step S8).

When the input of the third authentication information to the input screen M1 is completed, the second processing part 54A of the mobile terminal 50 notifies the first communication part 41 of the third authentication information, and the first communication part 41 transmits the third authentication information to the communication device 40 (step S10).

In other words, after activating the application as the pairing processing (after step S5), the mobile terminal 50 issues a connection request to the communication device 40 (step S6), and the communication device 40 requests the mobile terminal 50 of the third authentication information as the pairing processing (step S7).

In addition, the mobile terminal 50 displays the input screen M1 for inputting the third authentication information in response to the request of the third authentication information from the communication device 40 (step S9).

Upon receiving the third authentication information, the first processing part 46 of the communication device 40 judges whether or not the received third authentication information is related to the fourth authentication information preliminarily stored in the storage part 43. That is, the validity of the received third authentication information is confirmed (step S10).

When the third processing part 46 determines that the third authentication information is valid, that is, when the authentication between the third authentication information and the fourth authentication information is established (step S10, Yes), the first processing part 46 determines that the pairing is established (step S11).

Meanwhile, the fourth authentication information is information required for the authentication, and is consists of the predetermined alphanumeric characters or the like.

In purchasing the working machine 1, in renting the working machine 1, and the like, the purchaser preliminarily obtains the third authentication information associated with the fourth authentication information from the sales company, the manufacturing company, the rental company, and the like of the working machine 1. Then, the pairing processing can be completed by inputting the third authentication information to the input screen M1. Meanwhile, the obtaining of the third authentication information is just an example, and is not limited to that of the above-described embodiment.

After the pairing between the communication device 40 and the mobile terminal 50 is established (after step S11), the bidirectional communication between the first communication part 41 of the communication device 40 and the second communication part 51 of the mobile terminal 50 is established (step S12).

Meanwhile, in the first connection after the pairing is established, the mobile terminal 50 transmits, to the communication device 40, the unique information such as the MAC address as the third authentication information in addition to the third authentication information inputted to the input screen M1.

The communication device 40 stores the unique information such as the MAC address transmitted from the mobile terminal 50. As described above, after the pairing is established, the unique information is transmitted from the mobile terminal 50 to the communication device 40, while the unique information is stored in the communication device 40, whereby the pairing processing from step S8 to step S11 can be omitted in the next routine.

That is, in the connection between the mobile terminal 50 and the communication device 40 at least for the second time after the pairing is established, the mobile terminal 50 transmits the unique information to the communication device 40 after the application is activated 0 (step S5), and thereby the processing can be started from the data communication processing S12 shown below.

After the connection to the mobile terminal 50, the communication device 40 transmits, to the mobile terminal 50, the data relating to the working machine corresponding to the application of the mobile terminal 50 (step S13: a data transmission processing).

In the example described above, since the communication device 40 transmits the collection identifier to the mobile terminal 50 and thereby activates the collecting application, in the data transmission processing, the communication device 40 transmits the machine information temporarily stored in the storage part 43 as the data relating to the working machine.

That is, in the data transmission process, the communication device 40 transmits, to the mobile terminal 50, the data relating to the working machine such as the machine information without receiving the data request from the mobile terminal 50, after the connection with the mobile terminal 50.

That is, since the communication device 40 side transmits the application identifier to the mobile terminal 50, the communication device 40 side can know without inquiring the mobile terminal 50 that the mobile terminal 50 activates the application corresponding to the application identifier.

The second receiving part 51B in the second communication part 51 of the mobile terminal 50 receives, for example, the machine information as the data relating to the working machine transmitted from the communication device 40 (step S15).

The calculation part 54 of the mobile terminal 50 stores the machine information in the storage part 52 as the information to be accepted by the collecting application (step S16).

That is, the mobile terminal 50 stores the received data relating to the working machine as the data to be accepted by the activated application, in association with the application.

According to that configuration, even in the case where a plurality of applications are stored in the mobile terminal 50, the processing can be promptly executed on the application.

In the embodiment described above, the identifier setting part 45 sets the collection identifier for identifying the collecting application in the case where the data capacity of the untransmitted information that has not been transmitted to the mobile terminal 50 is equal to or more than a predetermined value. However, the collection identifier may be set in the case where there is at least the data to be transmitted to the mobile terminal 50.

In the embodiment described above, the application exemplifies the collecting application and the starting application, but the application is not limited thereto. For example, it may be a notifying application that notifies the mobile terminal 50 of the notifying information such as a warning of the working machine.

In that case, the identifier setting part 45 sets the application identifier (the notification identifier) corresponding to the notifying application. Thereafter, the communication device 40 transmits the notification identifier to the mobile terminal 50.

Upon receiving the notification identifier, the mobile terminal 50 establishes the communication with the communication device 40 after executing the pairing processing or the like. After the communication with the mobile terminal 50 is established, the communication device 40 transmits, for example, the notification information such as the warning as the data relating to the working machine.

After receiving the notification information, the mobile terminal 50 displays the notification information transmitted from the working machine (the communication device 40).

In this manner, the work machine can display the warning or the like on the mobile terminal 50 by transmitting the notification identifier to the mobile terminal 50 in the case where there is the information to be notified to the mobile terminal 50.

In addition, the number of applications is not limited to the above example, and may be two or more, three or more, or further more.

In addition, although the pairing processing is performed between the communication device 40 and the mobile terminal 50, the pairing processing may be omitted.

In the communication system for the working machine described above, the communication device 40 transmits the application identifier to the mobile terminal 50 with the beacon conforming to the BLE. The mobile terminal 50 activates the application corresponding to the application identifier. After the connection with the mobile terminal 50, the communication device 40 transmits, to the mobile terminal 50, the data relating to the working machine corresponding to the application of the mobile terminal 50.

According to that configuration, the communication device 40 transmits the application identifier with the beacon conforming to the BLE. In this manner, the mobile terminal 50 activates the application corresponding to the application identifier transmitted from the communication device 40 (the working machine) side, and then can easily obtain the data relating to the working machine from the communication device 40 (the working machine) side.

As described above, in the case where the application identifier is the collection identifier, the data collected by the working machine can be transmitted to the mobile terminal 50. And, in the case where the application identifier is the start identifier, the first authentication information can be received from the working machine.

The communication system for the working machine performs the processing for pairing (the pairing processing) between the communication device 40 and the mobile terminal 50 before transmitting the beacon to the mobile terminal 50 and before transmitting, to the mobile terminal 50, the data relating to the working machine.

According to that, even if the application identifier transmitted from the communication device 40 is received under the condition that no pairing is executed between the mobile terminal 50 and the communication device 40, it is possible for the processing to shift to the pairing processing.

The mobile terminal 50 issues the connection request to the communication device 40 after activating the application as the pairing processing, and the communication device 40 requests, as the pairing processing, the mobile terminal 50 for the authentication information (the third authentication information).

According to that, it is possible for the processing to shift to the pairing processing due to the application corresponding to the application identifier.

The mobile terminal 50 displays the input screen M1 for inputting the authentication information (the third authentication information) in response to the request for the authentication information (the third authentication information) from the communication device 40.

In this manner, the mobile terminal 50 can easily display, in the pairing processing, the input screen M1 for inputting the authentication information according to the request of the communication device 40.

In addition, the authentication information inputted to the input screen M1 can be transmitted to the communication device 40.

After the authentication of the authentication information (the third authentication information) is established, the communication device 40 transmits, to the mobile terminal 50, the data relating to the working machine.

In this manner, the various data of the working machine can be transmitted to the mobile terminal 50 after the establishment of the authentication information, that is, after the pairing processing is executed.

The mobile terminal 50 has the storage part 52 configured to receive and store the data relating to the working machine with the application.

According to that, the application activated corresponding to the application identifier can manage and process the various data of the working machine transmitted from the communication device 40.

The communication device 40 of the working machine has the first communication part 41 configured to transmit the application identifier to the mobile terminal 50 with the beacon conforming to the BLE and to transmit, to the mobile terminal 50, the data relating to the working machine corresponding to the application after the mobile terminal 50 activates the application corresponding to the application identifier.

According to that configuration, the first communication part 41 of the communication device 40 can transmit, to the mobile terminal 50, the application identifier with the beacon conforming to the BLE.

In addition, the first communication part 41 of the communication device 40 is capable of easily transmitting the data relating to the working machine after activating the application corresponding to the application identifier on the mobile terminal 50 side.

In the communication device 40 for the working machine, the first communication part 41 has the first processing part 46 configured to execute the processing for pairing with the mobile terminal 50 after transmitting the beacon to the mobile terminal 50 and before transmitting, to the mobile terminal 50, the data relating to the working machine. After establishing the authentication in the pairing processing, the first communication part 41 transmits, to the mobile terminal 50, the data relating to the working machine.

According to that configuration, even under the state where the pairing is not executed between the mobile terminal 50 and the communication device 40, the first processing part 46 is capable of executing the processing for pairing with the mobile terminal 50.

In addition, after the authentication is established in the pairing processing, the data relating to the working machine can be transmitted from the first communication part 41 to the mobile terminal 50.

The mobile terminal 50 includes the first receiving part 51A configured to receive the application identifier with the beacon transmitted from the communication device 40, that is, the beacon conforming to the BLE, the activating part 54B configured to activate the application corresponding to the application identifier, and the second receiving part 51B configured to receive the data relating to the working machine transmitted from the communication device 40, that is, the data corresponding to the application.

According to that configuration, the first receiving part 51A receives the beacon conforming to the BLE transmitted from the communication device 40, and thereby the mobile terminal 50 is capable of easily grasping the application identifier.

In addition, the activating part 54B is capable of activating the application corresponding to the application identifier after the first receiving part 51A receives the application identifier, and after the application is activated, the second receiving part 51B receives the various data of the working machine from the communication device 40.

The mobile terminal 50 has the second processing part 54B configured to execute the processing for pairing with the communication device 40 after the first receiving part 51A receives the beacon and before the second receiving part 51B receives the data relating to the working machine.

According to that configuration, even when the application identifier transmitted from the communication device 40 is received under the condition that no pairing is executed between the mobile terminal 50 and the communication device 40, the second processing portion 54 B progresses the processing to the pairing processing.

The second processing part 54B issues the connection request to the communication device 40 after activating the application as the pairing processing.

According to that configuration, the second processing part 54B is capable of progressing the processing to the pairing processing with an the application corresponding to the application identifier.

The second processing part 54B displays the input screen M1 configured to input the authentication information (the third authentication information) in response to the request from the communication device 40 in the pairing processing.

According to that configuration, in the pairing processing, the second processing part 54B is capable of easily displaying the input screen M1 configured to input the authentication information in accordance with the request of the communication device 40.

The mobile terminal 50 has the storage part 52 configured to receive and store, with the application, the data relating to the working machine.

According to that configuration, it is possible to manage and process the various data of the working machine transmitted from the communication device 50 on the application side activated corresponding to the application identifier.

The communication processing method for the working machine includes a step of transmitting, by the communication device 40, the application identifier to the mobile terminal 50 with the beacon conforming to the BLE, a step of activating, by the mobile terminal 50, the application corresponding to the application identifier, and a step of transmitting to the mobile terminal 50, by the communication device 40, the data relating to the working machine corresponding to the application of the mobile terminal 50 after the connection with the mobile terminal 50.

According to that configuration, since the communication device 40 transmits the application identifier with the beacon conforming to the BLE, the mobile terminal 50 is capable of easily obtaining the data relating to the working machine from the communication device 40 (the working machine) side after activating the application corresponding to the application identifier transmitted from the communication device 40 (the working machine) side.

The communication processing method for the working machine includes a step of executing the pairing processing between the communication device 40 and the mobile terminal 50 after transmitting the beacon to the mobile terminal 50 and before transmitting, to the mobile terminal 50, the data relating to the working machine.

According to that configuration, it is possible to progress the processing to the pairing processing even when the application identifier transmitted from the communication device 40 is received under the condition that no pairing is executed between the mobile terminal 50 and the communication device 40.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A communication system for a working machine, comprising:
   a communication device disposed on the working machine; and
   a mobile terminal to be connected to the communication device, wherein
   the communication device sets an application identifier corresponding to an application to be executed by the mobile terminal, and transmits a beacon including the application identifier to the mobile terminal, the beacon conforming to Bluetooth Low Energy,
   the application is at least one selected from a group consisting of a collecting application for collecting machine information of the working machine, a starting application for determining whether to allow an engine of the working machine to start, and a notifying application for notifying of warning and/or malfunction of the working machine,
   the mobile terminal refers the application identifier to activate the application, and then requests connection with the communication device,
   the communication device requests authentication information to the mobile terminal,
   the mobile terminal transmits the authentication information input by a user to the communication device,
   the communication device authenticates the authentication information transmitted from the mobile terminal so as to pair with the mobile terminal, and then transmits data relating the working machine, and the mobile terminal processes the data with the activated application.

2. The communication system according to claim 1, wherein
   the working machine is one selected from a group consisting of a backhoe, a tractor, a combine, and a rice transplanter, a compact track loader and a skid steer loader.

3. The communication system according to claim 1, wherein
   the data contains machine information relating to the working machine, and
   the mobile terminal collects and displays the machine information through the activated collecting application.

4. The communication system according to claim 3, wherein
   the machine information includes a time while an engine of the working machine has been driven.

5. The communication system according to claim 3, wherein
   the mobile terminal sets a collecting application identifier corresponding to the collecting application in case where an amount of the machine information which has not transmitted to the mobile terminal is greater than a predetermined value.

6. The communication system according to claim 3, wherein
   the mobile terminal periodically sets a collecting application identifier corresponding to the collecting application.

7. The communication system according to claim 1, wherein
   the data contains starting information relating to staring of an engine of the working machine, and
   the mobile terminal starts the engine of the working machine through the activated starting application.

8. The communication system according to claim 1, wherein
   the data contains notifying information relating to the warning and/or the malfunction of the working machine, and
   the mobile terminal notifies a user of the warning and/or the malfunction of the working machine through the activated notifying application.

9. A communication device used for the communication system according to claim 1.

10. A mobile terminal used for the communication system according to claim 1.

11. A communication processing method for communication between a communication device disposed on the working machine and a mobile terminal, the communication processing method, comprising:
    setting an application identifier corresponding to an application to be executed by the mobile terminal;
    transmitting a beacon including the application identifier from the communication device to the mobile terminal, the beacon conforming to Bluetooth Low Energy,
    the application being at least one selected from a group consisting of a collecting application for collecting machine information of the working machine, a starting application for determining whether to allow an engine of the working machine to start, and a notifying application for notifying of warning and/or malfunction of the working machine;
    referring the application identifier to activate the application, and then requests connection with the communication device;
    requesting authentication information to the mobile terminal;
    transmitting the authentication information input by a user from the mobile terminal to the communication device;
    authenticating the authentication information transmitted from the mobile terminal so as to process pairing between the communication device and the mobile terminal, and then transmits data relating the working machine from the communication device to the mobile terminal; and
    processing the data with the activated application.

12. The communication processing method according to claim 11, wherein
    the working machine is one selected from a group consisting of a backhoe, a tractor, a combine, and a rice transplanter, a compact track loader and a skid steer loader.

13. The communication processing method according to claim 11, wherein
    the data contains machine information relating to the working machine, and
    the mobile terminal collects and displays the machine information through the activated collecting application.

14. The communication processing method according to claim 11, wherein
    the machine information includes a time while an engine of the working machine has been driven.

15. The communication processing method according to claim 13, wherein
    the mobile terminal sets a collecting application identifier corresponding to the collecting application in case where an amount of the machine information which has not transmitted to the mobile terminal is greater than a predetermined value.

16. The communication processing method according to claim 13, wherein
the mobile terminal periodically sets a collecting application identifier corresponding to the collecting application.

17. The communication processing method according to claim 11, wherein
the data contains starting information relating to staring of an engine of the working machine, and
the mobile terminal starts the engine of the working machine through the activated starting application.

18. The communication processing method according to claim 11, wherein
the data contains notifying information relating to the warning and/or the malfunction of the working machine, and
the mobile terminal notifies a user of the warning and/or the malfunction of the working machine through the activated notifying application.

* * * * *